United States Patent [19]

Krammer

[11] 4,102,404

[45] Jul. 25, 1978

[54] ARTICULATED CULTIVATOR

[76] Inventor: Kelly A. Krammer, Box 144, Cupar, Canada, S0G 0Y0

[21] Appl. No.: 759,334

[22] Filed: Jan. 14, 1977

[30] Foreign Application Priority Data

Jan. 22, 1976 [CA] Canada .................................. 244166

[51] Int. Cl.$^2$ ............................................ A01B 23/04
[52] U.S. Cl. .................................. 172/310; 172/266; 172/679
[58] Field of Search ............... 172/310, 311, 632, 456, 172/630

[56] References Cited

U.S. PATENT DOCUMENTS

| 259,089 | 6/1882 | Burger | 172/630 X |
| 3,321,028 | 5/1967 | Groenke | 172/311 |
| 3,337,242 | 8/1967 | Richardson | 172/311 |
| 3,536,143 | 10/1970 | Hiebert | 172/311 |

Primary Examiner—Richard J. Johnson

Attorney, Agent, or Firm—Stanley G. Ade

[57] ABSTRACT

A cultivator section comprises an articulated frame supported by castor wheels and having both hinge connections and universal ball joint connections so that the frame can articulate when transversing uneven ground, gullies, etc. and maintaining the cultivating implements at a substantially even depth below ground surface. In other words the frame articulates so that it remains substantially parallel to the surface regardless of the unevenness of the surface. A hitch frame is connected to the cultivator frame at a plurality of the points and an even pull is thereby obtained. The cultivator section is easily adapted to transport position. A plurality of cultivator sections can be used in side by side relationship by adjusting the hitch frame so that a single section or a multiple section cultivator can be formed depending on the size of land to be cultivated and the amount of power available in the tractor or other towing means.

20 Claims, 7 Drawing Figures

ARTICULATED CULTIVATOR

BACKGROUND OF THE INVENTION

This invention relates to new and useful improvements in cultivators and sections forming said cultivators.

While relatively small cultivators are adequate in cultivating uneven ground, difficulties are encountered with wide cultivators, in maintaining an even depth of penetration of the cultivating elements particularly when used on uneven ground which may include gullies, ridges and the like.

Present day cultivators or other ground working implements may be built to a width of a 100 feet or more and it is extremely difficult to utilize such wide cultivators unless the ground is perfectly level, a condition rarely encountered.

Attempts have been made to hinge adjacent sections together so that the sections may move in a vertical direction but, to date, a successful implement has not been produced which allows both hinging action in a vertical direction and articulation of one portion of the frame relative to the other.

BACKGROUND OF THE INVENTION

This invention overcomes these disadvantages by providing a cultivator section which includes a pair of sub frames one upon each side of a main fore and aft beam. Each sub section and the main beam are hingedly connected together for movement in a vertical direction and a portion of each sub frame is connected by universal joints to another portion of the sub frame so that the universal joints lie diagonally with regards to one another thus allowing considerable articulation of the frame to take place. Cultivating elements depend from the sub frames and the sub frames are supported by castor wheels so that the sub frames remain substantially parallel to the ground surface regardless of the unevenness thereof thus assisting in the maintaining of an even depth of penetration of the cultivating implements.

Even when a relatively wide cultivator is built up by connecting sections or pairs of sections to a draw bar, each one is articulated independently so that this even penetration is maintained.

The principal object and essence of the invention is therefore to provide a cultivator section which includes a pair of sub sections one upon each side of a main beam, in which both vertical hinging action and limited articulation of the sub frames may take place.

Another object of the invention is to provide a device of the character herewithin described which includes novel hitch means which enables a plurality of cultivator sections to be joined together to form a cultivator of any desired multisectional width.

A still further object of the invention is to provide a device of the character herewithin described in which a relatively even depth of penetration is maintained regardless of the unevenness of the ground being traversed.

A still further object of the invention is to provide a device of the character herewithin described which is simple in construction, economical in manufacture and otherwise well suited to the purpose for which it is designed.

A still further object of the invention is to provide a device of the character herewithin described in which accumulative frame stresses are controlled to a tolerable limit.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
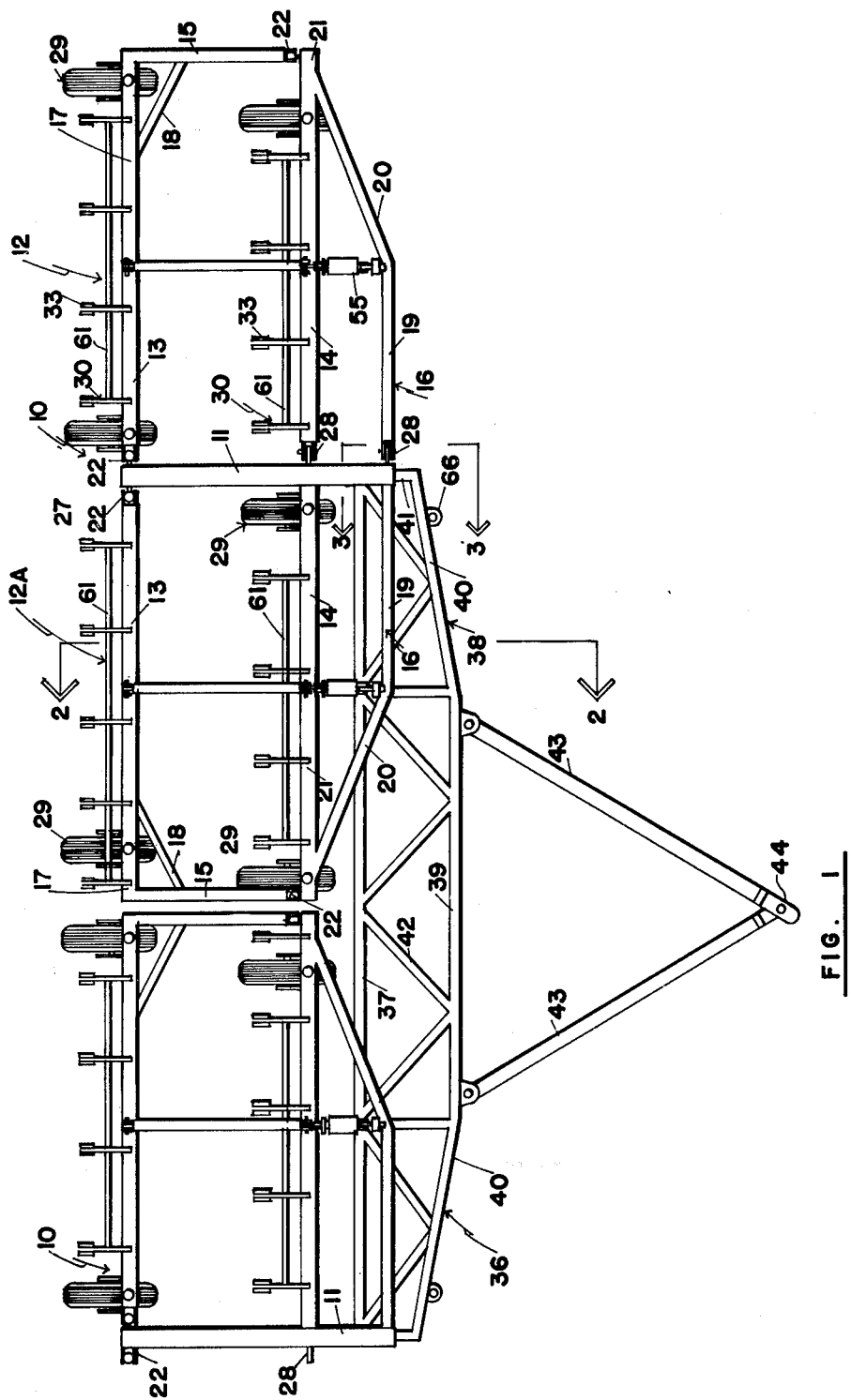
FIG. 1 is a top plan view of the invention showing two cultivator sections connected together by a common hitch frame.

Proceeding therefore to describe the invention in detail, reference should be made to the accompanying drawings in which reference character 10 illustrates one cultivator section. Each cultivator section includes a main beam 11 which is situated substantially centrally of the section 10 and extends from the front of the section to the rear of the section.

A pair of sub sections collectively designated 12 are situated one upon each side of the main beam 11, each sub section including a transversely extending rear chassis member 13, a transversely extending front chassis member 14, an end chassis member 15 and a front brace member collectively designated 16. In this embodiment, the end chassis member 15 is connected rigidly to the outer end 17 of the rear chassis member 13 with brace 18 being provided as illustrated.

The front brace member 16 includes the main portion 19 and a diagonal portion 20 extending from the outer end of the main portion 19 and being secured rigidly to the outer end 21 of the front chassis member 14. The sub sections are so constructed that the members 13 and 14 together with the portion 19 of the member 16, lie in substantially spaced and parallel relationship one with the other.

Figure 7:
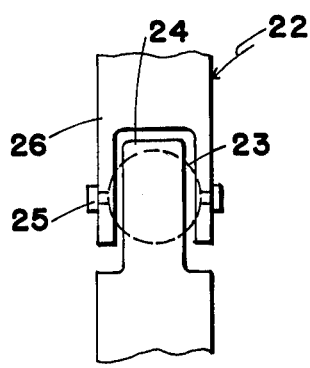
FIG. 7 is a fragmentary top plan view of one type of universal joint connection.

A universal joint connection 22 connects the front end of the end chassis member 15 to the outer end 21 of the front chassis member 14 and an example of the universal ball joints is shown in FIG. 7 in which a ball 23 is journalled for rotation within a socket formed in one end 24 of one of the members and is held by pins 25 in the end of the other member 26. This permits limited universal articulation of the two components but of course it will be appreciated that any form of ball joint or universal connection can be used at this location and at other locations as will hereinafter be described.

In a similar manner, a universal joint connection 22 is provided between the inner end of the rear chassis member 13 and the rear end 27 of the main beam 11.

With reference to FIG. 1, the sub sections on the lefthand side of the main beam 11, specifically designated 12A, include the front chassis member 14 being secured rigidly to the main beam 11 and extending outwardly therefrom. This means that one portion of the sub frame including the rear chassis member 13 and the end chassis member 15 is secured in an articulating manner by the diagonally situated universal joints or ball joints 22, to a fixed portion of the sub frame which includes the front chassis member 14, the brace members 19 and 20, and the main beam 11.

This provides the necessary articulation to the individual sub frames but further articulation is achieved by hinging the sub frames relative to one another for movement in a vertical direction only. This is provided by a hinge connection 28 extending between the inner ends of the front chassis member 14 and the front brace member 19. These hinge connections 28 enable the sub section on the righthand side of the main beam 11 to hinge in a vertical plane relative to the sub frame 12A situated on the lefthand side of the main beam.

The diagonally situated ball joints 22 in conjunction with the hinge points 28 give full articulation to the section regardless of the contour of the land being traversed.

Conventionally constructed castor wheel assemblies 29 are secured to the front and rear frame members 13 and 14 as illustrated and support the cultivator section in the usual way. Cultivating elements collectively designated 30 are secured to and depend from the main chassis members 13 and 14 and in this embodiment, they include a trip mechanism collectively designated 31, a shank holder 32, a shank 33 and a cultivating element in the form of a shovel 34.

However it will be appreciated that any form of cultivating element can depend from the frame members.

A single cultivator section 10 can be hitched behind a source of power such as a tractor in a relatively simple manner and because of the relatively narrow span of a single section (for example 12 or 15 feet) sufficient articulation is provided with a single section to maintain the cultivating elements 34 at a preset depth below the ground surface regardless of the contour of the terrain.

However it is usual to incorporate two or more sections 10 in side by side relationship.

Figure 5:
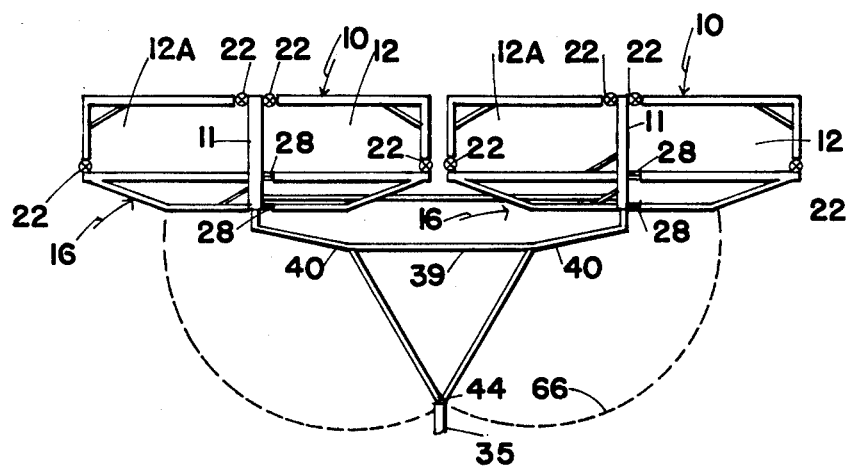
FIG. 5 is a schematic plan view showing two sections connected to a towing means.
Figure 6:
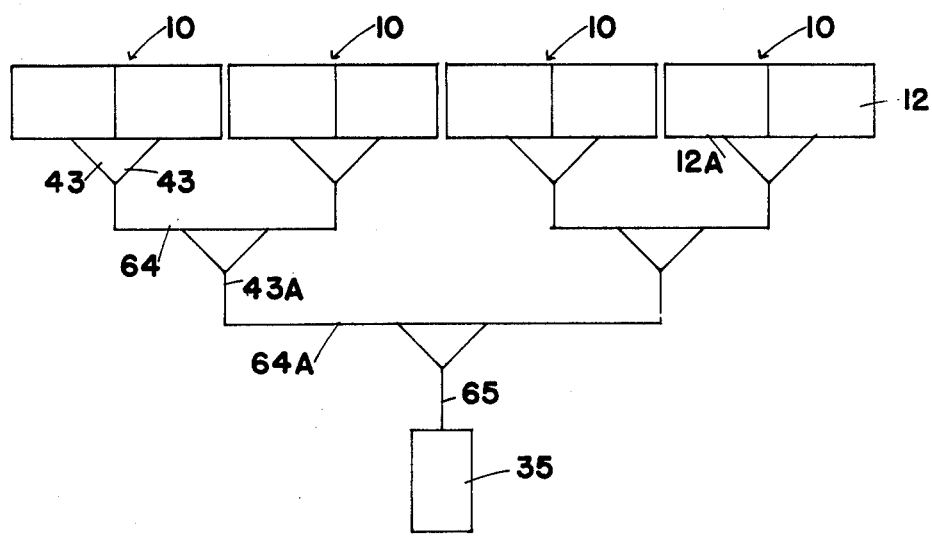
FIG. 6 is a schematic view showing four sections connected to a towing means.

FIGS. 5 and 6 show several alternative arrangements in a schematic manner, FIG. 5 illustrating two such sections in side by side relationship and FIG. 6 illustrating four sections in side by side relationship. Depending on the width of the individual sections (i.e. 12 or 15 feet for example), a cultivator having a span of for example, 12 feet to 120 feet may be pulled by a single tractor 15.

As the built up cultivator becomes wider, the question of maintaining the depth of cultivation becomes extremely important. With a relatively wide cultivator such as that illustrated in FIG. 6, a ridge or gully may be traversed at an angle for example and with the full articulation of the individual sections, the cultivating elements 34 will be maintained at a relatively constant preset depth below the ground surface.

If more than a single cultivator section is pulled by the tractor 35 then a hitch frame is required to maintain an even pull on all of the sections and such a hitch frame is illustrated in FIG. 1 and is identified by the reference character 36.

It consists of a rear chassis member 37 and a front chassis member collectively designated 38. Front chassis member 38 includes a central portion 39 and wing portions 40 extending one upon each side thereof and terminating in end chassis member 41 extending between the ends of the portions 40 and the ends of the rear chassis member 37. Various diagonal bracing members 42 are provided for strengthening in a conventional manner.

A pair of hitch bars 43 are pivoted by the rear ends thereof one to each end of the central section 39 of the front chassis member 38 and these converge together and terminate in overlapping apertured plates 44 by which they may be secured to the hitch of the tractor 35 in a conventional manner.

Figure 3:
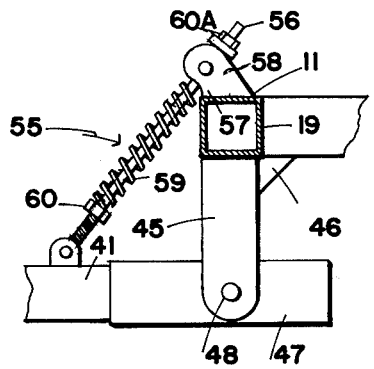
FIG. 3 is a fragmentary section substantially along the line 3—3 of FIG. 1.

Means are provided to connect the hitch frame 36 to the pair of cultivator sections 10 illustrated in FIG. 1. A drop arm 45 is secured to and depends from the front end of each main beam 11 and is braced by means of plate 46 as clearly shown in FIG. 3.

A horizontally located tube 47 forms part of the end member 41 of the hitch frame and this tube is supported within the lower end of the drop arm 45 with a universal mounting in the form of a ball joint 48 which is conventional in construction. This enables the hitch frame to apply an even pull to each section through the central beam 11 thereof.

Drag links are provided generally designated by reference character 49 and these drag links are situated inboard of the main beams 11. Each drag link includes a drop arm 50 extending downwardly from the front chassis member 14 of the adjacent sub frames and a plate 51 extending forwardly from the lower end of the drop arm 50. A drag link 52 is connected by means of a ball joint 53 to plate 51 and by means of a ball joint 54 to adjacent the rear chassis member 37 of the hitch frame. In this connection it is desirable that the ball joints 53 are in horizontal alignment with the ball joints 48 so that an even pull is applied to the cultivator sections connected to the hitch 36.

Figure 4:
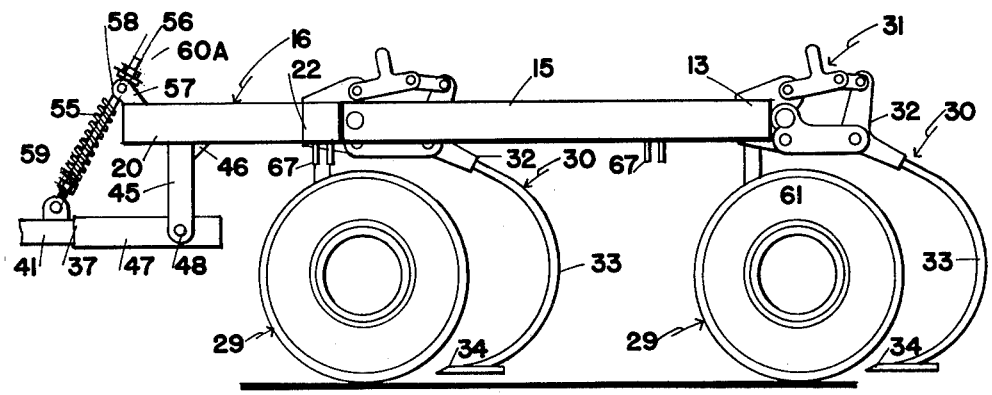
FIG. 4 is a side elevation of the device.

Because of the weight of the hitch and the torque developed through the shanks by the cultivating elements, means are provided to partially counteract the tendency of the sections to tilt forwardly thus causing uneven depth penetration of the cultivating element, said means taking the form of heavy duty compression spring assemblies 55 shown in detail in FIG. 4. Each assembly includes a rod 56 secured by one end thereof in a pivotal fashion, to adjacent the rear of the hitch frame 37 and extending through a clevis 57 held within a bracket 58 secured to and extending upwardly from the rear member 19 of the brace 16.

A heavy duty compression coil spring 59 extends around the rod and reacts between an adjusting nut 60 adjacent the lower end thereof and the clevis 57 tending to pivot the cultivator sections around the pivot points formed by the ball or universal joint connections 54 and 48. The spring assembly 55 is conventional and includes the retaining nut 60A on the upper end of rod 56.

Figure 2:
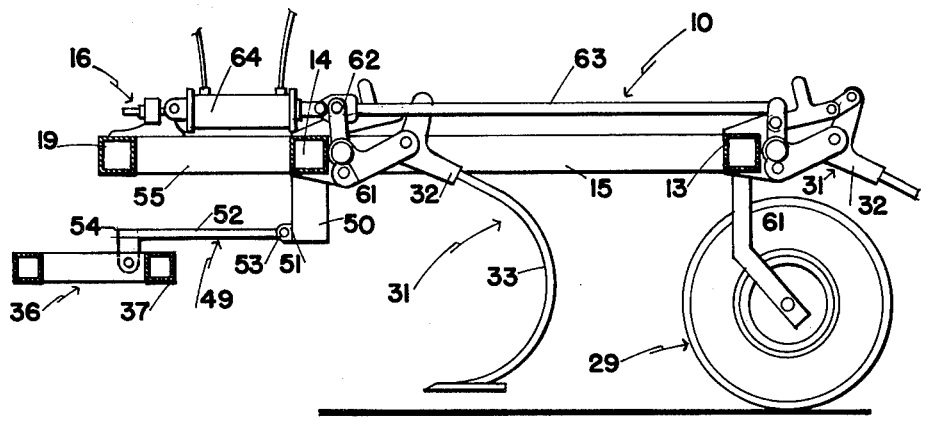
FIG. 2 is a partial section substantially along the line 2—2 of FIG. 1.

Referring back to FIGS. 2 and 4, the cultivating elements 34 are controlled by rotating same around pin 61 operated by rock shaft levers 62 and connected by links 63 to a fluid operator 64 mounted on fore and aft members 55 extending between the front chassis members 14 of the sub sections and the junction between the portions 19 and 20 of the brace member 16. However this portion of the apparatus does not form part of this invention so that it is not believed necessary to provide additional details thereof.

If more than two cultivator sections 10 are to be connected together as shown in FIG. 6, then the hitch members 43 would be connected by cross hitches 64, hitch members 43A, cross hitches 64A and a final hitch 65. However such a construction can take many forms, the principle to be observed being that all of the cultivator sections receive an even pull through the individual hitch frames 36.

If it is desired to move a relatively wide set of cultivating sections, from one location to another, the assembly is readily adapted to be placed in a transport position.

The hitch members 43 are disconnected from the source of power and these members are swung in the direction of arrows 66 (see FIG. 5) so that the plates 44 engage lugs 66 (see FIG. 1) and may be pinned into position by pins (not illustrated).

A pair of hitch bars (not illustrated) may then be connected to lugs 67 (see FIG. 4) and in turn connected to a tractor so that the assembly may be moved lengthwise. Under these conditions all of the castor wheel assemblies 29 swing so that the wheels are substantially in alignment with the chassis members 13 and 14.

Although the description refers to the use of an even number of cultivator sections, nevertheless it will be appreciated that an odd number of subsections can be used if desired. For example, by shifting the draw bar attachment centrally in FIG. 1, only the three subsections illustrated could be used.

In summary it will be appreciated that the individual cultivator sections 10 are articulated due to the diagonally situated ball joints 22 connecting parts of the sub frames to other parts of the sub frames and that the two sub frames of each section may hinge relative to one another, in a vertical direction thus maintaining the depth of penetration of the cultivator elements at a relatively even depth under the majority of uneven ground conditions which may be encountered in present day large scale farming.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A cultivator section adapted to be drawn by a source of power such as a tractor and comprising in combination a main beam extending from the front of said section to the rear thereof and a sub on each side of said main beam, means connecting said sub frames and said main beam for hinging action in a vertical direction of one sub frame relative to the other, further means connecting each of said sub frames and said main beam together for universal articulation of part of each of said sub frame relative to another part of each of said sub frame, cultivating elements secured to and depending from said sub frames, ground engaging wheels supporting said cultivating section, and hitch means for detachably connecting said cultivating section to the associated source of power, each said sub sections including a rear chassis member, a front chassis member situated in spaced and parallel relationship to said rear chassis member and an end chassis member extending between the outer ends of said rear and front chassis members, said rear chassis member and said end chassis member being secured together substantially at right angles to one another, said further means connecting said sub frames to said main beam including a universal joint connection between the inner end of said rear chassis member and the rear end of said main beam and a further universal joint connection between the outer end of said front chassis member and the front end of said end chassis member.

2. The cultivator section accoding to claim 1 in which said means connecting said sub frames and said main beam for hinging action includes the front chassis member of at least one of said sub frames being hingedly connected to said main beam.

3. The cultivator section according to claim 2 in which each of said sub sections includes a rear brace member extending from adjacent the outer end of the rear chassis member to said main beam and running substantially spaced and parallel to said rear chassis member.

4. The cultivator section according to claim 3 in which said hitch means includes a hitch frame, means to detachably connect said hitch frame to the associated source of power and means connecting said hitch frame to the front side of said sub sections, said last mentioned means including at least one main hitch member and at least one drag link member said main hitch member including a drop arm secured to and depending from said sub section adjacent the front side thereof and a universal joint connection between said hitch frame and said drop arm, said drag link including a link extending between said hitch frame and said sub section and a universal joint connection at each end of said link, the universal joint connection of said link to said hitch frame being in horizontal alignment with the universal joint connection of said main hitch member to said drop arm.

5. The cultivator section according to claim 2 in which said hitch means includes a hitch frame, means to detachably connect said hitch frame to the associated source of power and means connecting said hitch frame to the front side of said sub sections, said last mentioned means including at least one main hitch member and at least one drag link member said main hitch member including a drop arm secured to and depending from said sub section adjacent the front side thereof and a universal joint connection between said hitch frame and said drop arm, said drag link including a link extending between said hitch frame and said sub section and a universal joint connection of said link to said hitch frame being in horizontal alignment with the universal joint connection of said main hitch member to said drop arm.

6. The cultivator section according to claim 1 in which each of said sub sections includes a rear brace member extending from adjacent the outer end of the rear chassis member to said main beam and running substantially spaced and parallel to said rear chassis member.

7. The cultivator section according to claim 6 in which said hitch means includes a hitch frame, means to detachably connect said hitch frame to the associated source of power and means connecting said hitch frame to the front side of said sub sections, said last mentioned means including at least one main hitch member and at least one drag link member said main hitch member including a drop arm secured to and depending from said sub section adjacent the front side thereof and a universal joint connection between said hitch frame and said drop arm, said drag link including a link extending between said hitch frame and said sub section and a universal joint connection at each end of said link, the universal joint connection of said link to said hitch frame being in horizontal alignment with the universal joint connection of said main hitch member to said drop arm.

8. The cultivator section according to claim 1 in which said hitch means includes a hitch frame, means to detachably connect said hitch frame to the associated source of power and means connecting said hitch frame to the front side of said sub sections, said last mentioned means including at least one main hitch member and at least one drag link member said main hitch member including a drop arm secured to and depending from said sub section adjacent the front side thereof and a universal joint connection between said hitch frame and said drop arm, said drag link including a link extending between said hitch frame and said sub section and a universal joint connection of said link to said hitch frame being in horizontal alignment with the universal joint connection of said main hitch member to said drop arm.

9. A cultivator adapted to be drawn by a source of power such as a tractor and comprising in combination at least two cultivator sections each of said sections including a main beam extending from the front of said section to the rear thereof and a sub frame on each side of said main beam, means connecting said sub frames and said main beam for hinging action in a vertical direction of one sub frame relative to the other, further means connecting each of said sub frames and said main beam together for universal articulation of part of each of said sub frame relative to another part of each of said sub frame, cultivating elements secured to and depending from said sub frame, ground engaging wheels supporting said cultivating section, and hitch means for detachably connecting said cultivating sections to the associated source of power, each of said sub sections including a rear chassis member, a front chassis member situated in spaced and parallel relationship to said rear chassis member and and end chassis member extending between the outer ends of said rear and front chassis members, said rear chassis member and said end chassis member being secured together substantially at right angles to one another, said further means connecting said sub frames to said main beam including a universal joint connection between the inner end of said rear chassis member and the rear end of said main beam and a further universal joint connection between the outer end of said front chassis member and the front end of said end chassis member.

10. The cultivator according to claim 9 in which said means connecting said sub frames and said main beam for hinging action includes the front chassis member of at least one of said sub frames being hingedly connected to said main beam.

11. The cultivator according to claim 10 in which each of said sub sections includes a rear brace member extending from adjacent the outer end of the rear chassis member to said main beam and running substantially spaced and parallel to said rear chassis member.

12. The cultivator according to claim 11 in which said hitch means includes a hitch frame, means to detachably connect said hitch frame to the associated source of power and means connecting said hitch frame below the front side of said sections, said last mentioned means including at least one main hitch member for each of said sections adjacent each end of said hitch frame, and at least one drag link for each of said sections extending between said sections and said hitch frame inboard of said main hitch members, each of said main hitch members including a drop arm secured to and depending from said main beam of the relevant section and a universal joint connection between said main hitch member and the lower end of said drop arm, each of said drag link including a link extending between said hitch frame and said section and a universal joint connection at each end of said link connecting same to said hitch frame and said section respectively, the universal joint connection of said link to said hitch frame being in horizontal alignment with the universal connection of said main hitch member to said drop arm.

13. The cultivator according to claim 10 in which said hitch means includes a hitch frame, means to detachably connect said hitch frame to the associated source of power and means connecting said hitch frame below the front side of said sections, said last mentioned means including at least one main hitch member for each of said sections adjacent each end of said hitch frame, and at least one drag link for each of said sections extending between said sections and said hitch frame inboard of said main hitch members, each of said main hitch members including a drop arm secured to and depending from said main beam of the relevant section and a universal joint connection between said main hitch member and the lower end of said drop arm, each of said drag links including a link extending between said hitch frame and said section and a universal joint connection at each end of said link connecting same to said hitch frame and said section respectively, the universal joint connection at each end of said link connecting same to said hitch frame and said section respectively, the universal joint connection of said link to said hitch frame being in horizontal alignment with the universal connection of said main hitch member to said drop arm.

14. The cultivator according to claim 9 in which each of said sub sections includes a rear brace member extending from adjacent the outer end of the rear chassis member to said main beam and running substantially spaced and parallel to said rear chassis member.

15. The cultivator according to claim 14 in which said hitch means includes a hitch frame, means to detachably connect said hitch frame to the associates source of power and means connecting said hitch frame below the front side of said sections, said last mentioned means including at least one main hitch member for each of said sections adjacent each end of said hitch frame, and at least one drag link for each of said sections extending between said sections and said hitch frame inboard of said main hitch members, each of said main hitch members including a drop arm secured to and depending from said main beam of the relevant section and a universal joint connection between said main hitch member and the lower end of said drop arm, each of said drag link including a link extending between said hitch frame and said section and a universal joint connection at each end of said link connecting same to said hitch frame and said section respectively, the universal joint connection at each end of said link connecting same to said hitch frame and said section respectively, the universal joint connection of said link to said hitch frame being in horizontal alignment with the universal connection of said main hitch member to said drop arm.

16. The cultivator according to claim 9 in which said hitch means includes a hitch frame, means to detachably connect said hitch frame to the associated source of power and means connecting said hitch frame below the front side of said sections, said last mentioned means including at least one main hitch member for each of said sections adjacent each end of said hitch frame, and at least one drag link for each of said sections extending between said sections and said hitch frame inboard of said main hitch members, each of said main hitch members including a drop arm secured to and depending from said main beam of the relevant section and a universal joint connection between said main hitch member and the lower end of said drop arm, each of said drag links including a link extending between said hitch frame and said section and a universal joint connection at each end of said link connecting same to said hitch frame and said section respectively, the universal joint connection of said link to said hitch frame being in horizontal alignment with the universal connection of said main hitch member to said drop arm.

17. A cultivator section adapted to be drawn behind a source of power such as a tractor comprising in combination a main beam and a sub frame on each side of said main beam, each sub frame including a movable portion comprising a rear chassis member and an end chassis member secured together at right angles to one another, and a front chassis member extending from said main beam and being situated in spaced and parallel relationship to said rear chassis member and universal joint connections between the inner end of said rear chassis member and said main beam and between the front end of said end chassis member and the outer end of said front chassis member whereby said movable portion is articulately connected to the remaining portion of said sub frame and said main beam, and means hingedly connecting said sub frames and said main beam for hinging action in a vertical direction of one sub frame relative to the other sub frame, cultivator elements secured to and depending from said sub frames, ground engaging wheels supporting said cultivator section and hitch means for detachably connecting said cultivator section to the associated source of power, said hitch means including a hitch frame, means to detachably connect said hitch frame to the associated source of power and means connecting said hitch frame below the front side of said sections, said last mentioned means including at least one main hitch member for each of said sections adjacent each end of said hitch frame, and at least one drag link for each of said sections extending between said sections and said hitch frame inboard of said main hitch members, each of said main hitch members including a drop arm secured to and depending from said main beam of the relevant section and a universal joint connection between said main hitch member and the lower end of said drop arm, each of said drag link including a link extending between said hitch frame and said section and a universal joint connection at each end of said link connecting same to said hitch frame and said section respectively, the universal joint connection of said link to said hitch frame being in horizontal alignment with the universal connection of said main hitch member to said drop arm, each of said sub sections including a rear brace member extending from adjacent the outer end of said rear chassis member to said main beam and running substantially spaced and parallel to said rear chassis member, and compression spring means extending between adjacent each end of said hitch frame and said brace member, said compression spring means exerting pressure between said hitch member and said section and assisting in maintaining said cultivator elements in engagement with the ground.

18. The cultivator section according to claim 17 in which said means connecting said sub frames and said main beam for hinging action includes the front chassis member of at least one of said sub frames being hingedly connected to said main beam.

19. The cultivator section according to claim 18 in which each of said sub sections includes a rear brace member extending from adjacent the outer end of the rear chassis member to said main beam and running substantially spaced and parallel to said rear chassis member.

20. The cultivator section according to claim 17 in which each of said sub sections includes a rear brace member extending from adjacent the outer end of the rear chassis member to said main beam and running substantially spaced and parallel to said rear chassis member.

* * * * *